US012278075B2

(12) United States Patent
Pineda et al.

(10) Patent No.: US 12,278,075 B2
(45) Date of Patent: Apr. 15, 2025

(54) FUSE WITH ARC SUPPRESSING MASTIC MATERIAL

(71) Applicant: Littelfuse, Inc., Chicago, IL (US)

(72) Inventors: Martin G. Pineda, Fremont, CA (US); Marco Doms, Chicago, IL (US); Sergio Fuentes Godinez, Newark, NJ (US); Toshikazu Yamaoka, Chicago, IL (US); Satoshi Sakamoto, Chicago, IL (US); Hajime Takahashi, Chicago, IL (US); Keiichiro Nomura, Chicago, IL (US); Werner Johler, Shanghai (CN)

(73) Assignee: Littelfuse, Inc., Chicago, IL (US)

( * ) Notice: Subject to any disclaimer, the term of this patent is extended or adjusted under 35 U.S.C. 154(b) by 0 days.

(21) Appl. No.: 18/512,741

(22) Filed: Nov. 17, 2023

(65) Prior Publication Data

US 2024/0170244 A1 May 23, 2024

Related U.S. Application Data

(60) Provisional application No. 63/427,252, filed on Nov. 22, 2022.

(51) Int. Cl.
*H01H 85/38* (2006.01)
*H01H 85/06* (2006.01)
*H01H 85/08* (2006.01)

(52) U.S. Cl.
CPC ............ *H01H 85/38* (2013.01); *H01H 85/06* (2013.01); *H01H 85/08* (2013.01); *H01H 2085/388* (2013.01)

(58) Field of Classification Search
CPC .. H01H 85/38; H01H 85/06; H01H 85/08–12; H01H 2085/388; H01H 85/18; H01H 85/11; H01H 2085/383
See application file for complete search history.

(56) References Cited

U.S. PATENT DOCUMENTS

| | | | | | |
|---|---|---|---|---|---|
| 6,160,471 | A * | 12/2000 | Rybka | H01H 85/055 337/276 |
| 2008/0191832 | A1* | 8/2008 | Tsai | H01H 69/022 29/623 |
| 2008/0237194 | A1* | 10/2008 | Moore | H01H 85/42 252/2 |
| 2010/0207716 | A1* | 8/2010 | Yen | H01H 85/42 337/159 |
| 2016/0141140 | A1* | 5/2016 | Schmidt | H01H 85/143 337/187 |
| 2023/0154715 | A1* | 5/2023 | Narciso | H01H 85/0039 337/164 |

* cited by examiner

*Primary Examiner* — Jacob R Crum
(74) *Attorney, Agent, or Firm* — KDW Firm PLLC

(57) ABSTRACT

A fuse comprising including a housing, a fusible element disposed within the housing, first and second terminals extending from opposite ends of the fusible element and out of the housing, and a quantity of arc suppressing material disposed on the fusible element, wherein the arc suppressing material is formed of a polyamide hotmelt adhesive mixed with a flame retardant.

16 Claims, 3 Drawing Sheets

FUSE WITH ARC SUPPRESSING MASTIC MATERIAL

CROSS-REFERENCES TO RELATED APPLICATIONS

This application claims the benefit of U.S. Provisional Patent Application No. 63/427,252, filed Nov. 22, 2022, which is incorporated by reference herein in its entirety.

FIELD OF THE DISCLOSURE

The present disclosure relates generally to the field of circuit protection devices and relates more particularly to a high breaking capacity fuse with arc-mitigating features.44

FIELD OF THE DISCLOSURE

Fuses are commonly used as circuit protection devices and are typically installed between a source of electrical power and a component in a circuit that is to be protected. Generally, a fuse includes a fusible element disposed within an electrically insulating fuse body. Electrically conductive terminals extend from opposing ends of the fusible element for facilitating electrical connection of the fuse within a circuit. Upon the occurrence of a fault condition in the circuit (e.g., an overcurrent condition or an overtemperature condition), the fusible element melts or otherwise opens to arrest the flow of electrical current through the fuse, thereby protecting connected electrical components.

When the fusible element of a fuse is melted during a fault condition it is sometimes possible for an electrical arc to propagate between the separated portions of the fusible element (e.g., through vaporized particulate from the melted fusible element). The electrical arc may rapidly heat the surrounding air and ambient particulate and may cause a small explosion within the fuse. In some cases, the explosion may rupture the fuse body, potentially causing damage to surrounding components. The likelihood of rupture is generally proportional to the severity of the fault condition. The maximum current that a fuse can arrest without rupturing is referred to as the fuse's "breaking capacity." It is generally desirable to maximize the breaking capacity of a fuse without significantly increasing the cost, size, or form factor of the fuse.

It is with respect to these and other considerations that the present improvements may be useful.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

A fuse in accordance with an exemplary embodiment of the present disclosure may include a housing, a fusible element disposed within the housing, first and second terminals extending from opposite ends of the fusible element and out of the housing, and a quantity of arc suppressing material disposed on the fusible element, wherein the arc suppressing material is formed of a polyamide hotmelt adhesive mixed with a flame retardant.

A fuse in accordance with another exemplary embodiment of the present disclosure may include a housing, a plurality of fusible elements disposed within the housing, first and second terminals extending from opposite ends of the plurality of fusible elements and out of the housing, and a quantity of arc suppressing material disposed on the plurality of fusible elements, wherein the arc suppressing material is formed of a polyamide hotmelt adhesive mixed with a flame retardant.

Figure 1:
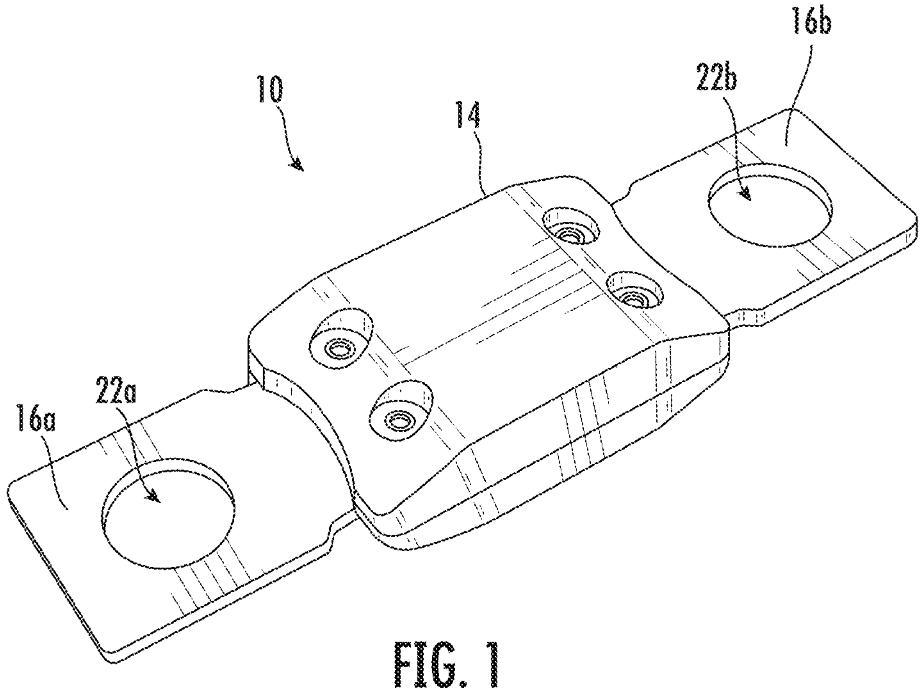
FIG. 1 is a perspective view illustrating a fuse in accordance with an embodiment of the present disclosure.

The drawings are not necessarily to scale. The drawings are merely representations, not intended to portray specific parameters of the disclosure. The drawings are intended to depict example embodiments of the disclosure, and thus are not to be considered as limiting in scope. In the drawings, like numbering represents like elements.

Furthermore, certain elements in some of the figures may be omitted, or illustrated not-to-scale, for illustrative clarity. The cross-sectional views may be in the form of "slices", or "near-sighted" cross-sectional views, omitting certain background lines otherwise visible in a "true" cross-sectional view, for illustrative clarity. Furthermore, for clarity, some reference numbers may be omitted in certain drawings.

DETAILED DESCRIPTION

A fuse in accordance with the present disclosure will now be described more fully hereinafter with reference to the accompanying drawings, in which certain exemplary embodiments of the fuse are presented. The fuse may be embodied in many different forms and is not to be construed as being limited to the embodiments set forth herein. These embodiments are provided so that this disclosure will be thorough and complete, and will fully convey the scope of the fuse to those skilled in the art. In the drawings, like numbers refer to like elements throughout unless otherwise noted.

Figure 2:
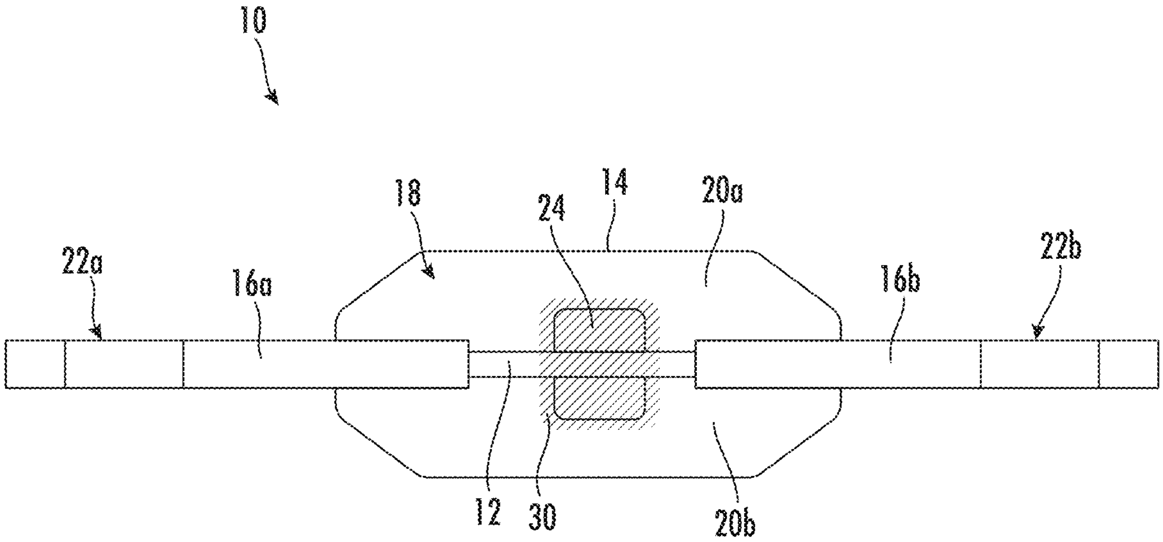
FIG. 2 is a cross-sectional side view illustrating the fuse of FIG. 1.

Referring to FIGS. 1 and 2, a perspective view and a cross sectional side view illustrating a fuse 10 in accordance with an exemplary embodiment of the present disclosure are provided, respectively. For the sake of convenience and clarity, terms such as "top," "bottom," "up," "down," "upper," "lower," "above," and "below" may be used herein to describe the relative positions and orientations of various components of the fuse 10, all with respect to the geometry and orientation of the fuse 10 as it appears in FIGS. 1 and 2. Said terminology will include the words specifically mentioned, derivatives thereof, and words of similar import.

The fuse 10 may generally include a fusible element 12 disposed within a housing 14, and first and second terminals 16*a*, 16*b* extending from opposite ends of the fusible element 12 and out of the housing 14. The fusible element 12 and the first and second terminals 16*a*, 16*b* may be made from any of a variety of electrically conductive materials, including, but not limited to, copper, tin, silver, zinc, aluminum, alloys including such materials, or combinations thereof. The housing 14 may be formed of any suitable dielectric material, including, but not limited to, plastic, ceramic, various composites, etc. The fusible element 12 and the first and second terminals 16*a*, 16*b* may be formed using any of a variety of techniques, including, but not limited to, stamping, cutting, and printing, and can include forming the fusible element 12 and the first and second terminals 16*a*, 16*b* separately or as one piece. If the fusible element 12 and the first and second terminals 16*a*, 16*b* are formed separately (i.e., in separate pieces), the pieces may subsequently be joined together using various techniques, including, for example, soldering, welding, or other known joining processes.

In various embodiments, the housing 14 may include a plurality of segments or parts that are joined together to define a cavity 18 within which the fusible element 12 is disposed. For example, the housing 14 may include upper and lower segments 20*a*, 20*b* that may be joined together (e.g., via, heat staking, riveting, ultrasonic welding, etc.) to form a contiguous, substantially sealed body that protects the fusible element 12 from external elements. The first and second terminals 16*a*, 16*b* may protrude from the housing 14 and may facilitate electrical connection of the fuse 10 within a circuit. For example, the first and second terminals 16*a*, 16*b* may include respective first and second mounting holes 22*a*, 22*b* formed therein for receiving bolts or posts (now shown) for connecting the fuse 10 to a source of electrical power (e.g., a battery) and to a load.

Figure 3B:
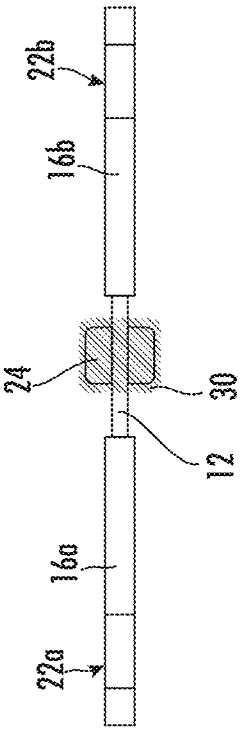
FIG. 3B is a side view illustrating a fusible element and terminals of the fuse of FIG. 1 in an untripped state.
Figure 3A:
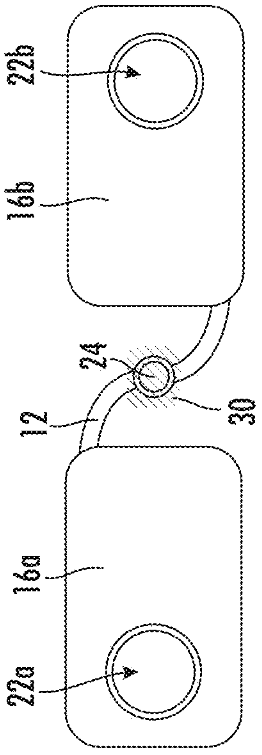
FIG. 3A is a top view illustrating a fusible element and terminals of the fuse of FIG. 1 in an untripped state.

Referring to FIGS. 3A and 3B, a top view and a side view illustrating the fusible element 12 and the first and second terminals 16*a*, 16*b* of the fuse 10 are shown (the housing 14 is omitted for clarity). The fusible element 12 may be configured to melt, disintegrate, or otherwise open if current flowing through the fuse 10 exceeds a predetermined threshold, or "current rating," of the fuse 10, or if the fusible element 12 exceeds a predetermined temperature. In certain embodiments, the fusible element 12 may have a serpentine shape as shown in FIG. 3A. The present disclosure is not limited in this regard. In various embodiments, the fusible element 12 may include perforations, slots, thinned or narrowed segments, and/or various other features for making certain portions of the fusible element 12 more susceptible to melting or opening relative to other portions of the fusible element. In various embodiments, a quantity of dissimilar metal 24 (hereinafter "the metal spot 24"), sometimes referred to as a "Metcalf spot," may be applied to a central portion of the fusible element 12. The metal spot 24 may be formed of one or more of nickel, indium, silver, tin, or other metal having a lower melting temperature than the base metal (e.g., copper) from which the fusible element 12 is formed. The metal spot 24 may therefore melt more readily than the base metal of the fusible element 12 upon the occurrence of an overcurrent condition and may diffuse into the base metal. The base metal of the fusible element 12 and the dissimilar metal of the metal spot 24 are chosen such that the diffusion of one into the other results in an intermetallic phase with a lower melting temperature and higher resistance than those of the base metal alone, which causes the central portion of the fusible element 12 to melt more readily than other portions of the fusible element 12. In various embodiments of the fuse 10 the metal spot 24 may be entirely omitted.

The fuse 10 may further include a quantity of arc suppressing material 30 disposed on the fusible element 12. In various embodiments, the arc suppressing material 30 may be disposed on a specific portion of the fusible element 12 that is adapted to melt in the event of an overcurrent or overtemperature condition (e.g., on the metal spot 24). The arc suppressing material 30 may be formed of a polyamide hotmelt adhesive mixed with a flame retardant. The polyamide hotmelt adhesive may be a mastic or resinous material that exhibits good chemical resistance and that is suitable for bonding to metal and plastic. An example of such a material is TECHNOMELT PA 6206 manufactured and sold by HENKEL. The present disclosure is not limited in this regard. In one example, the flame retardant may be magnesium hydroxide provided in an amount of 1% by weight of the arc suppressing material 30. Other suitable flame retardants include, but are not limited to, melamine, aluminum oxide, and alumina trihydrate. The arc suppressing material 30 may be applied to the fusible element 12 in a melted, fluid state, which may facilitate intimate contact with the fusible element 12. Upon cooling, the arc suppressing material 30 may harden into a solid, amber-like material.

Figure 4B:
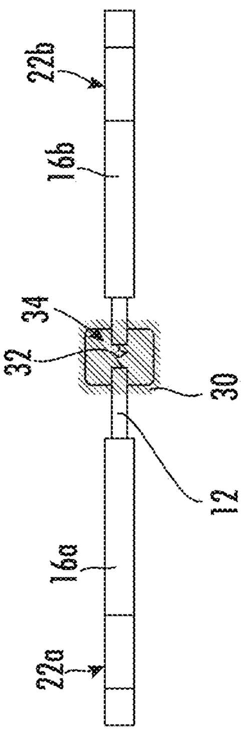
FIG. 4B is a side view illustrating a fusible element and terminals of the fuse of FIG. 1 in a tripped state.
Figure 4A:
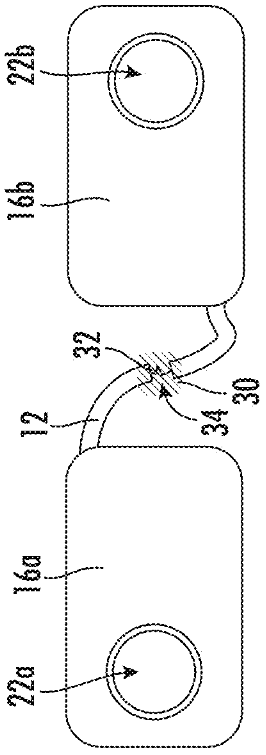
FIG. 4A is a top view illustrating a fusible element and terminals of the fuse of FIG. 1 in a tripped state.

Upon the occurrence of an fault condition in the fuse 10, the central portion of the fusible element 12 may melt and separate, and an electrical arc 32 may propagate across the gap 34 left between the separated ends of the fusible element 12 as shown in FIGS. 4A and 4B. Heat from the electrical arc 32 may melt the arc suppressing material 30 which, in a fluid state, may then flow into the gap 34 and quench the electrical arc 32. Heat from the electrical arc 32 may also burn/decompose the arc suppressing material 30, causing the arc suppressing material 30 to undergo an endothermic chemical reaction that absorbs heat. The electrical arc 32 is thereby rapidly cooled. Furthermore, certain byproducts of the endothermic chemical reaction may be nonconductive gases (e.g., ammonia) that may hinder the ability of the electrical arc 32 to persist. Still further, decomposition of the magnesium hydroxide in the arc suppressing material 30 produces water, which may further cool the electrical arc 32. Thus, the arc suppressing material 30 may, upon the occurrence of a fault condition in the fuse 10, absorb heat, release gases that are unfavorable to sustaining an electrical arc, and produce water which may further cool the electrical arc, all of which may contribute to rapid arc quenching. The duration and severity of electrical arcing within the fuse 10 is thereby mitigated, which in-turn provides the fuse 10 with an improved breaking capacity relative to traditional fuses.

Figure 5:
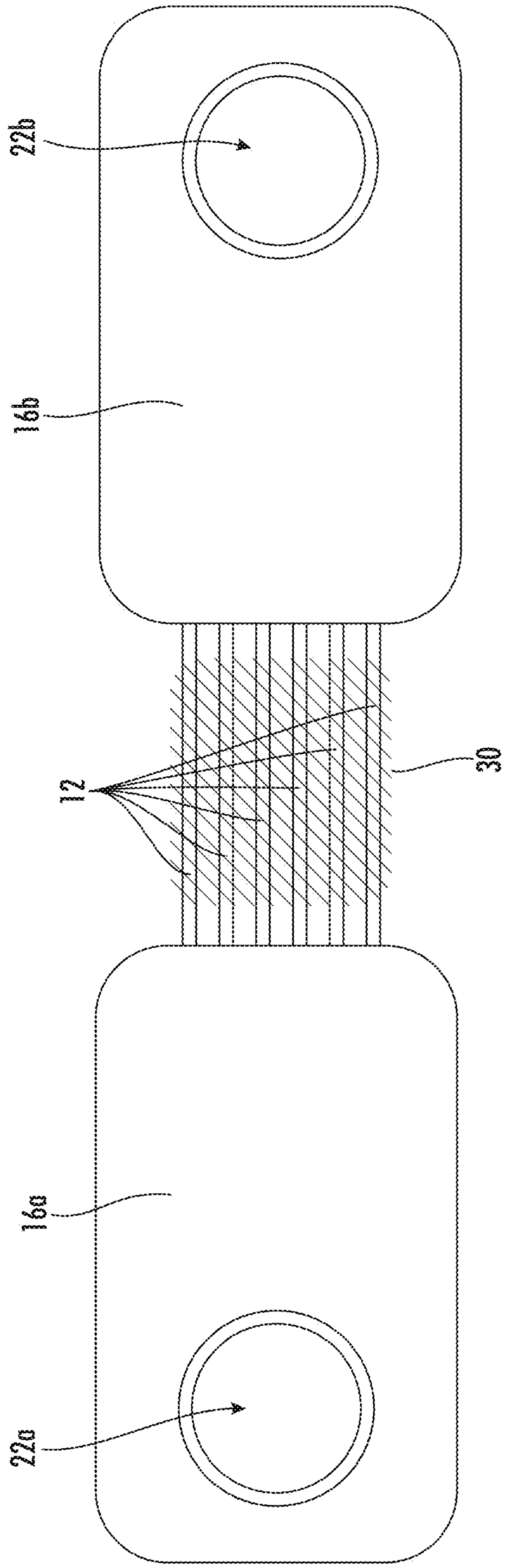
FIG. 5 is a top view illustrating a fusible element and terminals in accordance with an alternative embodiment of the present disclosure.

Referring to FIG. 5, a top view illustrating an alternative embodiment of the present disclosure is shown wherein, instead of a single fusible element 12 extending between the first and second terminals 16*a*, 16*b*, a plurality of fusible elements 12 extend between the first and second terminals 16*a*, 16*b* in parallel, all covered with the arc suppressing material 30 described above. Each of the plurality of fusible elements 12 may be smaller (e.g., thinner/narrower) than the single fusible element 12 shown in the embodiments of FIGS. 2-4B. For example, each of the plurality of fusible elements 12 may have a width in a range of 0.4 millimeters to 5 millimeters and a thickness in a range of 0.1 millimeters to 2 millimeters. Thus, each of the plurality of fusible elements 12 may be adapted to melt at a lower temperature (e.g., 140-150 degrees Celsius) than the single fusible element 12 shown in the embodiments of FIGS. 2-4B. An embodiment of the fuse 10 incorporating the plurality of fusible elements 12 shown in FIG. 5 may be adapted to safely handle and interrupt current at voltages equal to or greater than an embodiment having a larger, single fusible element. However, since each of the plurality of fusible elements 12 carries a relatively small amount of current, electrical arcing is greatly mitigated upon the occurrence of an fault condition, and such arcing may be completely and rapidly extinguished by the arc suppressing material 30 (in the manner described above).

As used herein, an element or step recited in the singular and proceeded with the word “a” or “an” should be understood as not excluding plural elements or steps, unless such exclusion is explicitly recited. Furthermore, references to “one embodiment” of the present disclosure are not intended to be interpreted as excluding the existence of additional embodiments that also incorporate the recited features.

While the present disclosure makes reference to certain embodiments, numerous modifications, alterations and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof.

The invention claimed is:

1. A fuse comprising:
- a housing;
- a fusible element disposed within the housing;
- first and second terminals extending from opposite ends of the fusible element and out of the housing; and
- a quantity of arc suppressing material disposed on the fusible element, wherein the arc suppressing material is formed of a polyamide hotmelt adhesive mixed with a flame retardant.

2. The fuse of claim 1, wherein the arc suppressing material is disposed on a portion of the fusible element that is adapted to melt upon the occurrence of fault condition in the fuse.

3. The fuse of claim 1, wherein the arc suppressing material entirely surrounds the fusible element.

4. The fuse of claim 1, wherein the flame retardant is magnesium hydroxide provided in an amount of 1% by weight of the arc suppressing material.

5. The fuse of claim 1, wherein the flame retardant is one of melamine, aluminum oxide, and alumina trihydrate.

6. The fuse of claim 1, wherein the fusible element has a serpentine shape.

7. The fuse of claim 1, wherein the fusible element is formed of a first metal, and wherein the fuse further comprises quantity of a second metal disposed on the fusible element, the second metal being different than the first metal and having a lower melting temperature than the first metal.

8. The fuse of claim 1, wherein the quantity of the second metal is formed of one or more of nickel, indium, silver, and tin.

9. The fuse of claim 1, wherein the arc suppressing material surrounds the quantity of the second metal.

10. A fuse comprising:
- a housing;
- a plurality of fusible elements disposed within the housing;
- first and second terminals extending from opposite ends of the plurality of fusible elements and out of the housing; and
- a quantity of arc suppressing material disposed on the plurality of fusible elements, wherein the arc suppressing material is formed of a polyamide hotmelt adhesive mixed with a flame retardant.

11. The fuse of claim 10, wherein the arc suppressing material is disposed on portions of the plurality of fusible elements that are adapted to melt upon the occurrence of a fault condition in the fuse.

12. The fuse of claim 10, wherein the arc suppressing material entirely surrounds the plurality of fusible elements.

13. The fuse of claim 10, wherein the flame retardant is magnesium hydroxide provided in an amount of 1% by weight of the arc suppressing material.

14. The fuse of claim 10, wherein the flame retardant is one of melamine, aluminum oxide, and alumina trihydrate.

15. The fuse of claim 10, wherein each of the plurality of fusible elements is oriented parallel to each of the other of the plurality of fusible elements.

16. The fuse of claim 10, wherein each of the plurality of fusible elements has a width in a range of 0.4 millimeters to 5 millimeters and a thickness in a range of 0.1 millimeters to 2 millimeters.

* * * * *